(12) United States Patent
Zhu et al.

(10) Patent No.: US 8,503,947 B2
(45) Date of Patent: Aug. 6, 2013

(54) MULTI-RADIO TEST METHOD AND TEST FIXTURE

(75) Inventors: Yujie Zhu, Shanghai (CN); Kunquan Sun, Shanghai (CN); Yanbing Yu, Shanghai (CN); Chao Wang, Shanghai (CN); Kangzheng Wang, Shanghai (CN)

(73) Assignee: Murata Manufacturing Co., Ltd., Kyoto (JP)

( * ) Notice: Subject to any disclaimer, the term of this patent is extended or adjusted under 35 U.S.C. 154(b) by 540 days.

(21) Appl. No.: 12/895,912

(22) Filed: Oct. 1, 2010

(65) Prior Publication Data

US 2012/0083219 A1 Apr. 5, 2012

(51) Int. Cl.
*H04B 17/00* (2006.01)
(52) U.S. Cl.
USPC .................... 455/67.14; 455/67.11
(58) Field of Classification Search
USPC ................. 455/67.14, 67.11, 67.13
See application file for complete search history.

(56) References Cited

U.S. PATENT DOCUMENTS

| | | | | |
|---|---|---|---|---|
| 6,104,304 | A * | 8/2000 | Clark et al. | 340/664 |
| 6,847,804 | B2 * | 1/2005 | Chen | 455/67.14 |
| 6,879,827 | B2 * | 4/2005 | Richards et al. | 455/423 |
| 7,257,504 | B2 * | 8/2007 | Bolander et al. | 702/106 |
| 8,374,552 | B2 * | 2/2013 | Rupp et al. | 455/63.1 |
| 2002/0160717 | A1 * | 10/2002 | Persson et al. | 455/67.1 |
| 2007/0275667 | A1 * | 11/2007 | Leung et al. | 455/67.14 |
| 2012/0231745 | A1 * | 9/2012 | Gregg et al. | 455/67.12 |
| 2012/0282863 | A1 * | 11/2012 | Guo et al. | 455/67.12 |

* cited by examiner

*Primary Examiner* — Lewis West
(74) *Attorney, Agent, or Firm* — Keating & Bennett, LLP

(57) ABSTRACT

A method for testing characteristics of a communication device that includes a plurality of modules using a test fixture includes the steps of connecting the communication device to the test fixture, determining if tests to be performed on the plurality of modules can be simultaneously performed, performing the tests to be performed on the plurality of modules for any tests that are determined can be simultaneously performed, calculating a numerical value for each of the plurality of modules if it is determined that the tests to be performed cannot be simultaneously performed, selecting one of the tests based on the calculated numerical value, and performing the selected one of the tests based on the calculated numerical value and suspending the test or tests on the remaining modules of the plurality of modules other than the selected one of the tests.

11 Claims, 5 Drawing Sheets

| Module | Test No. | Parameter/Characteristic |
|---|---|---|
| 1 | T1 | CPU |
|  | T4 | RF spectrum 1 |
|  | T7 | Memory |
|  | T9 | RF spectrum 2 |
| 2 | T2 | Memory |
|  | T5 | Connection |
|  | T8 | RF spectrum 1 |
|  | T10 | RF spectrum 2 |
| 3 | T3 | RF spectrum 1 |
|  | T6 | CPU |
|  | T11 | RF spectrum 2 |

FIG.2

MULTI-RADIO TEST METHOD AND TEST FIXTURE

BACKGROUND OF THE INVENTION

1. Field of the Invention

The present invention relates to a multi-radio test method for testing a plurality of radio modules in a communication device, and more particularly, to a multi-radio test method that reduces the overall time required to test all of the radio modules in a communication device.

2. Description of the Related Art

Recently, increasingly complex communication devices have been developed that include various radio modules in order to increase the functionality of the communication device. For example, communication devices have been developed that include a plurality of radio modules, such as, for example, a WiFi (Wireless Fidelity including IEEE 802.11 technologies such as including 802.11a, 802.11b, 802.11g, and 802.11n) module, a WiMax (Worldwide Interoperability for Microwave Access) module, a BT (Blue Tooth) module, a GPS (Global Positioning System) module, a UWB (Ultra-WideBand) module, a RFID (Radio Frequency Identification) module, a MDTV (Mobile Digital Television) module, a VoIP (Voice over Internet Protocol) module, and a WCDMA (Wideband Code Division Multiple Access) module.

During a manufacturing testing phase, various parameters and characteristics, such as, for example, CPU speed, radio frequency spectrum, memory, and connection, of each of the modules provided in the communication devices must be tested. In addition, different radio modules, such as those listed above, may use different host interfaces, such as, for example, a USB (Universal Serial Bus) interface, an SDIO (Secure Disk Input Output) interface, an SPI (Serial Peripheral Interface) interface, a UART (Universal Asynchronous Receiver/Transmitter) interface, and an HPI (Hardware Platform Interface) interface. Therefore, conventionally, each parameter and characteristic of each of the modules must be separately tested with a specific testing device having a specific interface. Thus, it has been difficult to automatically test all parameters and characteristics of all modules.

In addition, after all of the appropriate parameters and characteristics of a first radio module have been tested, the appropriate parameters and characteristics of a subsequent radio module are tested. Since conventional testing methods are capable of testing the parameters and characteristics of only a single radio module at a time, a large amount of time is required to test all of the appropriate parameters and characteristics of all of the radio modules included in a complex communication device.

SUMMARY OF THE INVENTION

In order to overcome the problems described above, preferred embodiments of the present invention provide a multi-radio test method of automatically testing the parameters and characteristics of a plurality of radio modules of a complex communication device at the same time so as to greatly reduce the amount of time required to test all the parameters and characteristics of all of the radio modules included in a complex communication device.

A preferred embodiment of the present invention provides a method for testing characteristics of a communication device that includes a plurality of modules using a test fixture including the steps of connecting the communication device to the test fixture, determining if tests to be performed on the plurality of modules can be simultaneously performed, performing the tests to be performed on the plurality of modules for any tests that are determined can be simultaneously performed, calculating a numerical value for each of the plurality of modules if it is determined that the tests to be performed cannot be simultaneously performed, selecting one of the tests based on the calculated numerical value, and performing the selected one of the tests based on the calculated numerical value and suspending the test or tests on the remaining modules of the plurality of modules other than the selected one of the tests.

The numerical value may preferably be a ratio of time required to test with a specific testing device to an overall amount of time that has passed. Alternatively, the numerical value may preferably be a ratio of a time to complete the tests using a specific testing device of a module of the plurality of modules to a time to complete all of the tests of all of the plurality of modules.

The plurality of modules are preferably selected from the group consisting of a WiFi module, a WLAN module, a WiMax module, a UWB module, a MDTV module, a GPS module, a Blue Tooth module, and a WCDMA module. However, the plurality of modules may include any suitable module.

Preferably, the test fixture includes a microprocessor, for example, and a plurality of different types of interfaces arranged to connect the plurality of modules to the test fixture.

Another preferred embodiment of the present invention provides a test fixture for testing characteristics of a communication device that includes a plurality of modules including a plurality of interfaces arranged to be connected to the plurality of modules of the communication device, and a controller arranged to determine if tests to be performed on the plurality of modules can be simultaneously performed, to perform the tests to be performed on the plurality of modules for any tests that are determined can be simultaneously performed, to calculate a numerical value for each of the plurality of modules if it is determined that the tests to be performed cannot be simultaneously performed, to select one of the tests based on the calculated numerical value, and to perform the selected one of the tests based on the calculated numerical value and suspending the test or tests on the remaining modules of the plurality of modules other than the selected one of the tests.

The plurality of interfaces are preferably selected from the group consisting of a universal serial bus interface, a secure disk input output interface, a serial peripheral interface, an universal asynchronous receiver/transmitter interface, and a hardware platform interface. However, the plurality of interfaces may include any suitable interfaces.

The numerical value calculated by the controller may preferably be a ratio of time required to test with a specific testing device to an overall amount of time that has passed. Alternatively, the numerical value calculated by the controller may preferably be a ratio of a time to complete the tests using a specific testing device of a module of the plurality of modules to a time to complete all of the tests of all of the plurality of modules.

The controller is preferably a microprocessor, for example.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a chart showing an example of the parameters and characteristics of three modules to be tested and the test number of each test.

DETAILED DESCRIPTION OF PREFERRED EMBODIMENTS

Preferred embodiments of the present invention will be described below with reference to the drawings.

Figure 1:
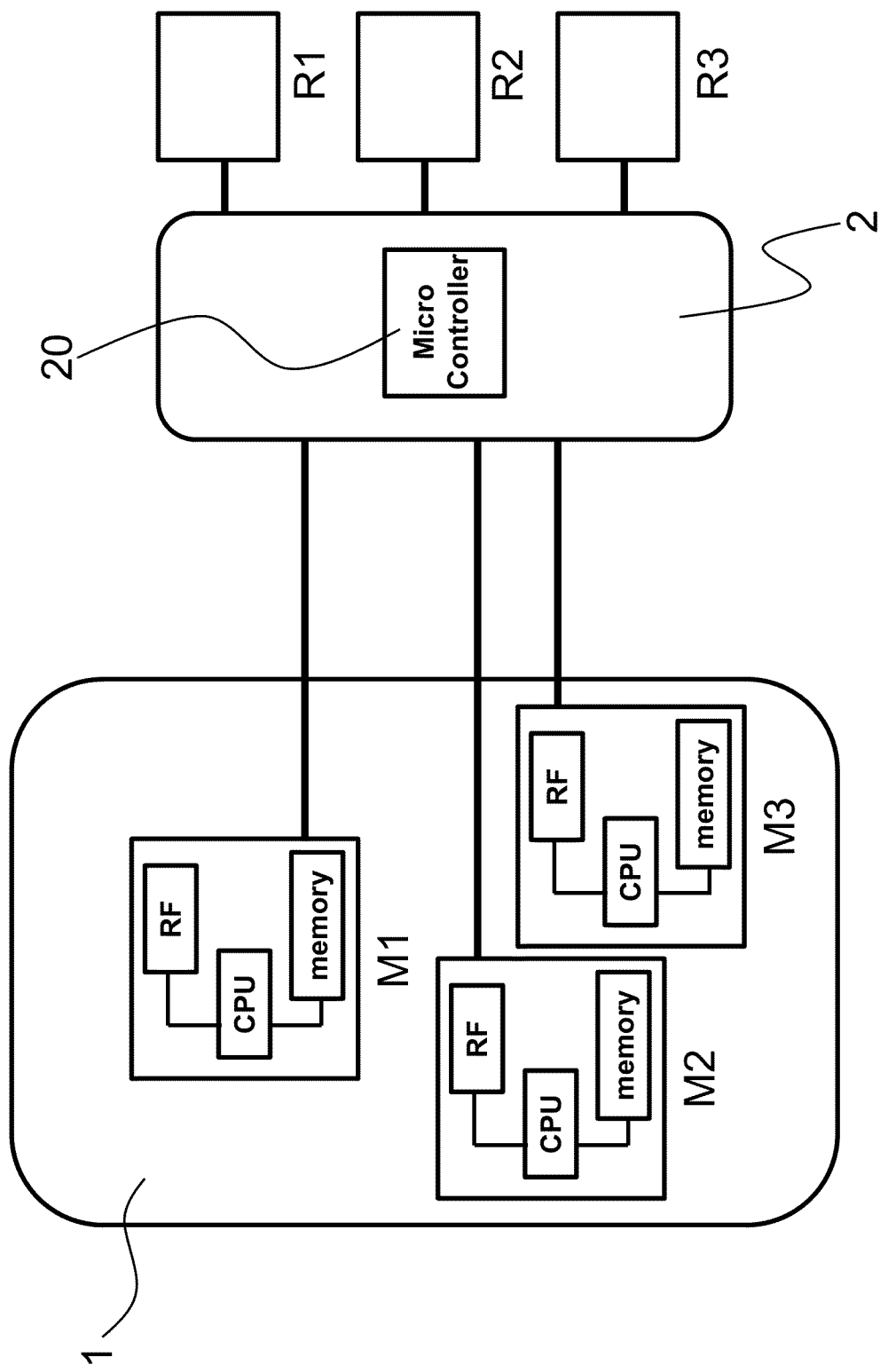
FIG. 1 is a schematic view showing a test fixture connected to a communication device.

A test fixture 2 used in a testing method according to a preferred embodiment of the present invention is shown in FIG. 1. As shown in FIG. 1, a communication device 1 preferably includes, for example, three modules, M1, M2, M3, such as radio modules. For example, the module M1 may preferably be a WiFi module, the module M2 may preferably be a WiMax module, and the module M3 may preferably be a WCDMA module. Each of the modules M1, M2, M3 preferably includes various components such as, for example, a CPU (central processing unit), a memory, a connection port (not shown), and an RF (radio frequency) processor. Each of various components in the modules M1, M2, M3 or each of various parameters and characteristics of the modules M1, M2, M3 must be tested during the manufacture of the communication device 1.

Although each of the modules M1, M2, M3 in this preferred embodiment includes three components to be tested, the modules M1, M2, M3 may include any suitable number of components to be tested based on the type of modules provided in the communication device 1 and the applications thereof.

Figure 5:
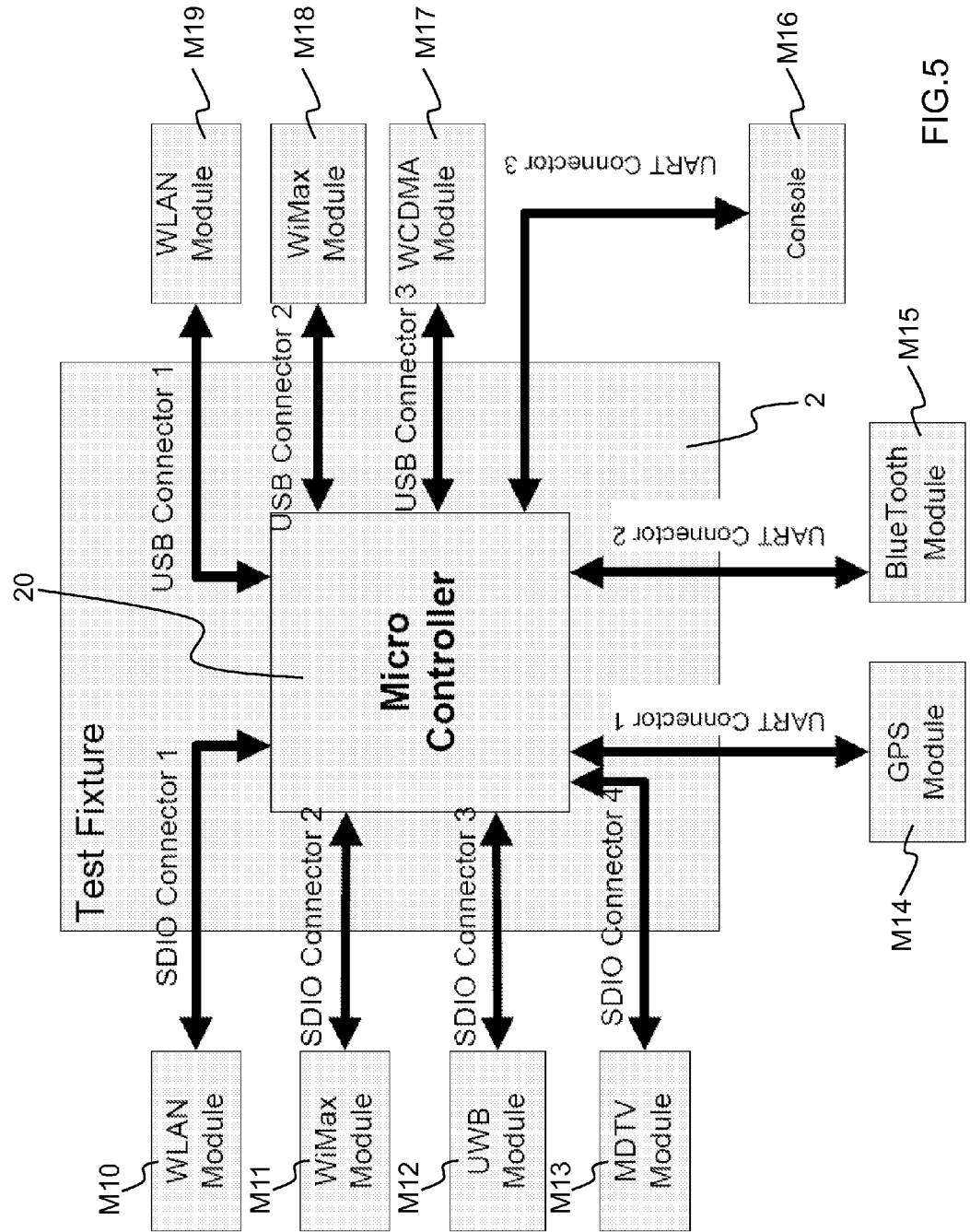
FIG. 5 is a block diagram of a test fixture used in a testing method according to a preferred embodiment of the present invention.

The test fixture 2 includes, for example, a microprocessor 20 and a plurality of interfaces that are arranged to be connected with each of the modules M1, M2, M3 of the communication device 1. FIG. 5 schematically shows in more detail various interfaces provided between various modules. For example, the WLAN (Wireless Local Area Network) Module M10 (corresponding to the module M1 in FIG. 1) is connected to the test fixture 2 via the SDIO Connector 1, the WiMax Module M11 (corresponding to the module M2 in FIG. 1) is connected to the test fixture 2 via the SDIO Connector 2, the UWB (Ultra-Wideband) Module M12 is connected to the test fixture 2 via the SDIO Connector 3, the MDTV (Mobile Digital TV) Module M13 is connected to the test fixture 2 via the SDIO Connector 4, the GPS (Global Positioning System) Module M14 is connected to the test fixture 2 via the UART Connector 1, the Blue Tooth Module M15 is connected to the test fixture 2 via the UART Connector 2, the Console M16 is connected to the test fixture 2 via the UART Connector 3, the WCDMA Module M17 (corresponding to the module M3 in FIG. 1) is connected to the test fixture 2 via the USB Connector 3, the WiMax Module M18 is connected to the test fixture 2 via the USB Connector 2, the WLAN Module M19 is connected to the test fixture 2 via the USB Connector 1. The test fixture 2 may include any appropriate number and types of interfaces based on the types of communication devices to be tested.

In addition, as shown in FIG. 1, the test fixture 2 is connected to, for example, three testing devices R1, R2, R3. The three testing devices R1, R2, R3 are used to measure various parameters and characteristics of the modules M1, M2, M3. Although the test fixture 2 shown in FIG. 1 is connected to three testing devices R1, R2, R3, the test fixture 2 may be connected to any desired number of testing devices depending upon the types of modules to be tested and the number and type of parameters and characteristics to be tested in each module.

To explain how the parameters and characteristics of all modules are tested, an example is described below with reference to FIG. 2. As shown in FIG. 2, the parameters and characteristics of the module M1 to be tested are the CPU, the RF spectrum 1, the memory, and the RF spectrum 2, which are tested in this order. Tests T1, T4, T7, ant T9 are to be performed on the module M1. The components of the module M2 to be tested are the memory, the connection, the RF spectrum 1, and the RF spectrum 2, which are tested in this order. Tests T2, T5, T8, and T10 are to be performed on the module M2. The components of the module M3 to be tested are the RF spectrum 1, the CPU, and the RF spectrum 2, which are tested in this order. Tests T3, T6, and T11 are to be performed on module M3.

In the method according to this preferred embodiment, the order in which components of each of the modules M1, M2, M3 are tested is set in advance. The testing parameters of the RF spectrum 1 and the RF spectrum 2 include, for example, a transmission power measurement, a receiving sensitivity measurement, and other suitable measurements. Each of the parameters of the RF spectrum 1 and the RF spectrum 2 are preferably measured by the same testing device.

The method of testing the modules M1, M2, M3 in the situation shown in FIG. 2 using the test fixture 2 shown in FIG. 1 is described below with reference to FIG. 3. At time t1, the test fixture 2 begins testing each of the modules M1, M2, M3. Since the tests T1, T2, and T3 to be performed on the three modules M1, M2, M3 are different from one another, each test T1, T2, T3 on each module M1, M2, M3 utilizes a different testing device R1, R2, R3. Therefore, the test fixture 2 is controlled such that the three tests T1, T2, T3 are performed simultaneously. That is, each of the three tests T1, T2, T3 begins at time t1.

At time t2, the test T3 of module M3 is finished. Although the next test T6 to be performed on module M3 is related to the CPU, the testing device R1 for testing the CPU is being used for the test T1 of module M1. Thus, the test T6 is suspended or delayed until the testing device R1 is available. I1 in FIG. 3 denotes an idle time at which the module M3 is not being tested. Then, at time t3, the test T1 of module M1 is finished. At this time (time t3), the test T6 begins on module M3.

At time t4, the test T7 is finished. Although the next test T9 of module M1 is related to RF spectrum, the testing device R3 for RF spectrum is being used for the test T8 of module M2. Thus, the test T9 is suspended or delayed. I2 in FIG. 3 denotes an idle time at which the module M2 is not being tested. At time t5, the test T6 of Module M3 is finished. Although the next test T11 of module M3 is related to RF spectrum, the test device R3 for RF spectrum is being used for the test T8 of module M2. Thus, the test T11 is also suspended or delayed.

At time t6, the test T8 of module M2 is finished. At this time, no tests are being performed on any of the modules M1, M2, M3. In addition, the next tests T9, T10, T11 to be performed on the three modules M1, M2, M3 are all related to RF spectrum. In order to determine which test T9, T10, T11 will be performed first, the following algorithm according to a preferred embodiment of the present invention is used. The algorithm is described below.

$$D1=(U1+Alpha*T9/Tmax)/(1+Alpha)-TARGET1$$

$$D2=(U2+Alpha*T10/Tmax)/(1+Alpha)-TARGET2$$

$$D3=(U3+Alpha*T11/Tmax)/(1+Alpha)-TARGET3$$

$$U1=T4/(T1+T4+T7+l2)$$

$$U2=T8/(T2+T5+T8)$$

$$U3=T3/(T3+11+T6+T3)$$

$$TARGET1=(T4+T9)/(T1+T2+T3+T4+T5+T6+T7+T8+T9+T10+T11)$$

$$TARGET2=(T8+T10)/(T1+T2+T3+T4+T5+T6+T7+T8+T9+T10+T11)$$

$$TARGET3=(T3+T11)/(T1+T2+T3+T4+T5+T6+T7+T8+T9+T10+T11)$$

Tmax: the maximum value of T9, T10, T11

At t6, the tests T9, T10, and T11 have not yet been performed. Thus, the actual time required for the tests T9, T10, and T11 is not known. Thus, predicted values for the times required for the tests T9, T10, and T11 are stored in the memory of the test fixture 2 and used in the algorithm described above.

Although Tmax is preferably used in the algorithm described above, alternatively, Tadd may be used instead of Tmax, wherein Tadd=T9+T10+T11.

The algorithm described above selects the test T9, T10, T11 which has the smallest value of D1, D2, and D3 as the next test to be performed. A small value for Dn means either X or Y, or both X and Y described below.

X: The value "(U1+Alpha*T9/Tmax)/(1+Alpha)" of D1, for example, is small.

This value is called "the current utilization rate." When the current utilization rate is small, the ratio of time required to test with a specific testing device (in this example, testing device R3 used for RF spectrum) in a module (in this example, module M1) to the overall amount of time that has passed (T1+T4+T7+l2) is small. This means that it is highly possible that many tests with the specific testing device remain to be performed in the particular module. This is true in the modules M2 (the value "(U2+Alpha*T10/Tmax)/(1+Alpha)") and M3 (the value "(U3+Alpha*T11/Tmax)/(1+Alpha)").

Y: The value "Target 1" of D1, for example, is large.

This value is called "the target utilization rate." When the target utilization rate is large, the ratio of time required to complete all tests using a specific testing device (in this example, testing device R3 used for RF spectrum) of a certain module (in this example, module M1) to the time required to complete all of the tests of all the modules (T1+T2+T3++T10+T11) is large. This means that the certain module requires a large amount of time to complete the tests with the specific test device. This is true in the modules M2 (TARGET2) and M3 (TARGET3).

The current utilization rate and the target utilization rate are used to select the test which has higher priority. By selecting the test having the higher priority, the idle time in the module is minimized, and thus, the overall time required to complete all of the tests is minimized.

In the algorithm described above, Alpha is a specific value within 0 and 1. Alpha is determined in advance based on empirical knowledge. When Alpha is equal to 0, the algorithm selects the next test to be performed based on historic date. On the other hand, when Alpha is not equal to 0, the algorithm selects the next test to be performed based on the current competing tests, i.e., the tests T9, T10, and T11) in addition to the historic data.

Figure 3:
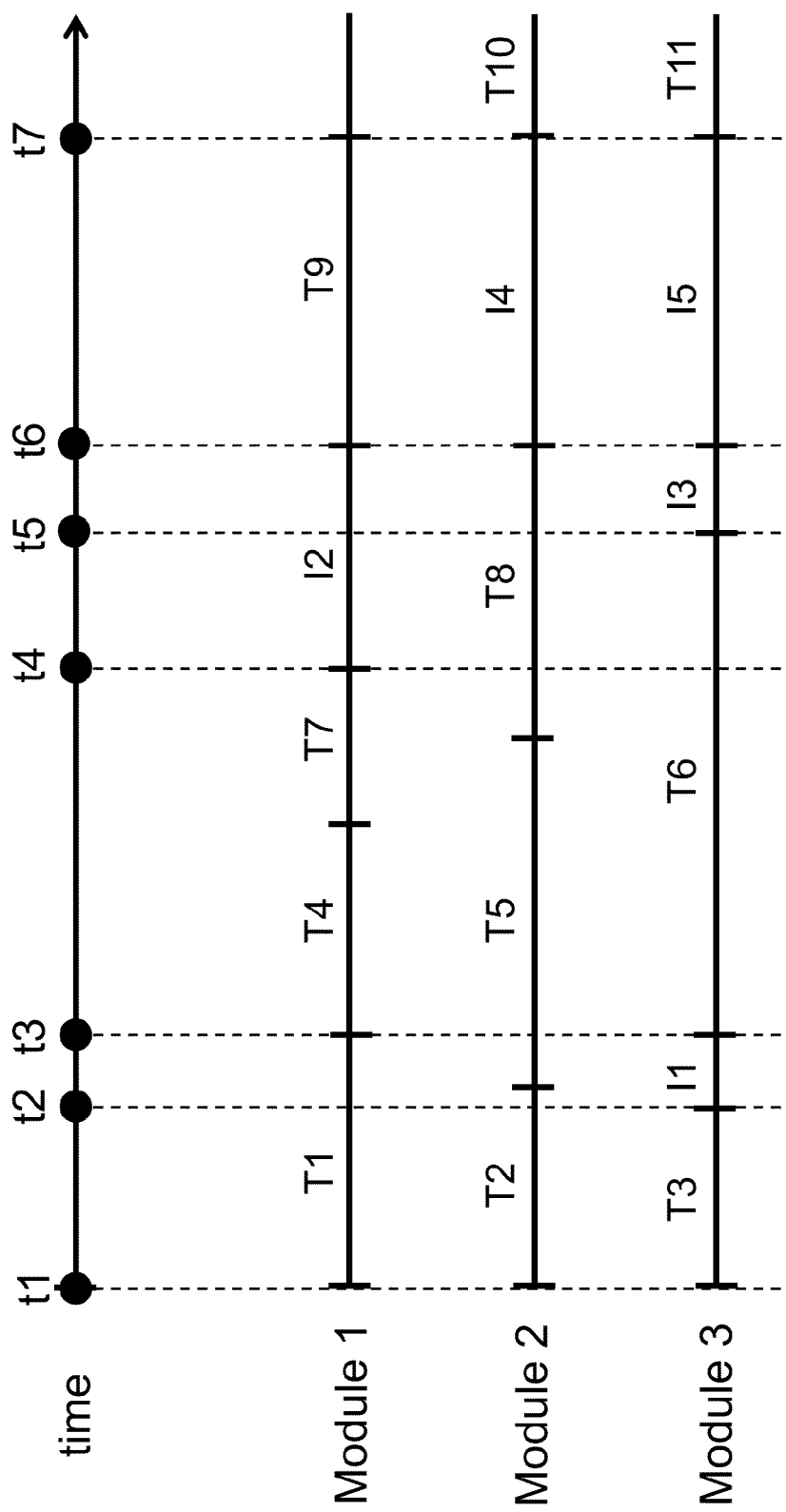
FIG. 3 is a chart showing the sequence in which the tests shown in FIG. 2 are performed.

In FIG. 3, the algorithm selects the test T9 to be performed, such that the tests T10 and T11 are suspended or delayed. At time t7, the test T9 is finished. At this time, the test fixture will select either T10 or T11 as the next test case based on the algorithm described above.

Figure 4:
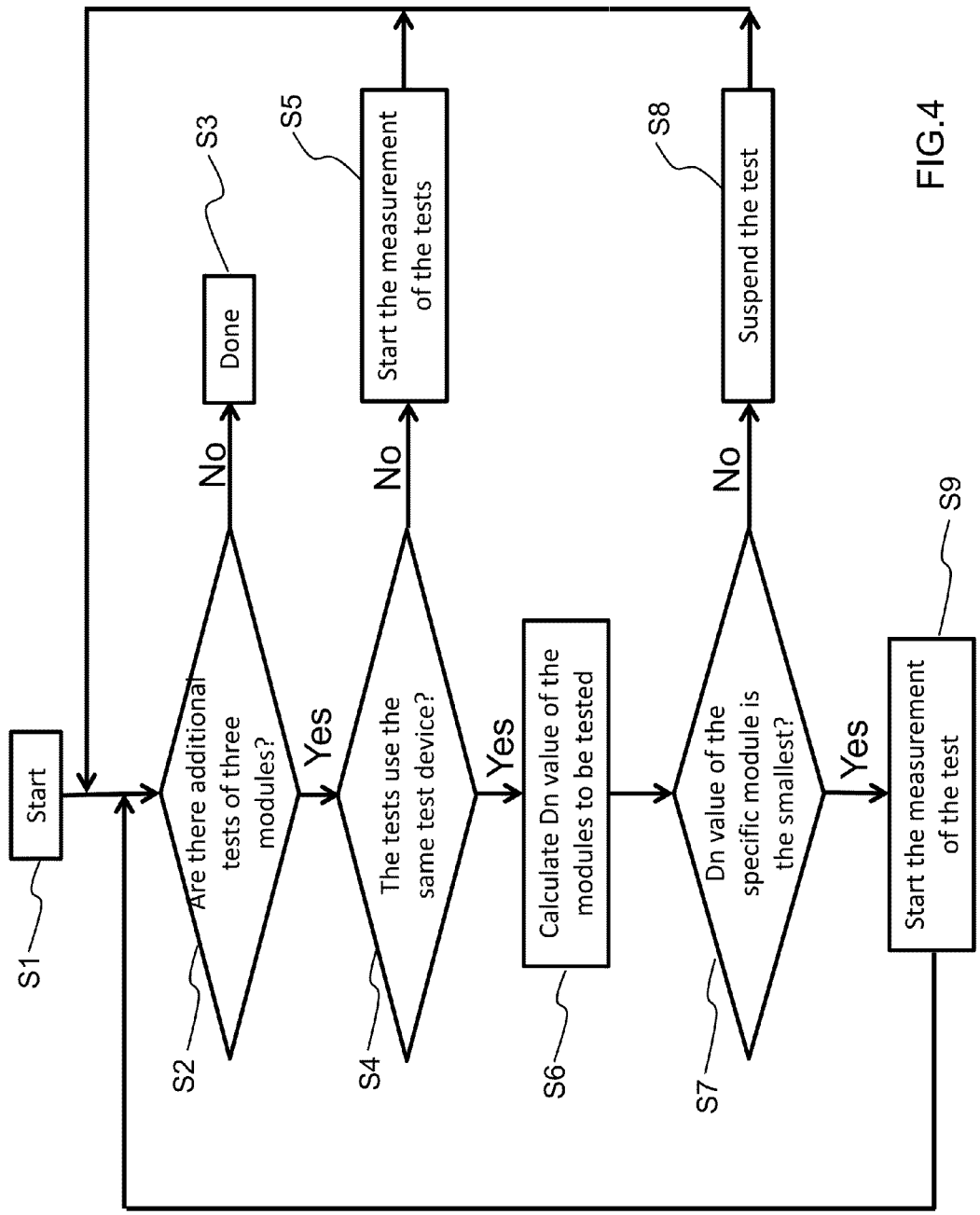
FIG. 4 is a flow chart showing a testing method according to a preferred embodiment of the present invention.

FIG. 4 is the flow diagram of the method according to a preferred embodiment of the present invention. As shown in FIG. 4, the method according to this preferred embodiment begins at S1. In step S1, the test fixture 2 checks to determine whether any tests remain to be performed on any of the modules M1, M2, M3. If the test fixture 2 determines at step S2 that no tests remain to be performed on any of the modules M1, M2, M3, then the test fixture 2 determines that testing has been completed at step S3. If the test fixture 2 determines at step S2 that additional tests remain to be performed on any of the modules M1, M2, M3, then the method proceeds to step S4.

In step S4, the test fixture 2 determines whether any of the remaining tests use the same test device. If the test fixture 2 determines that none of the remaining tests use the same test device, then the test fixture 2 starts the measurement of the test at step S5. If the test fixture 2 determines that two or more tests use the same test device, then the test fixture 2 calculates in step S6 the Dn value for each of the modules for which tests remain to be performed. In step S7, the test fixture 2 determines which test for which module has the smallest Dn value, and starts the measurement of the test at step S9. For the tests that do not have the smallest Dn value, the test is suspended at step S8 until the test device is available.

The steps S2 to S9 are repeated until all of the tests have been completed.

In this preferred embodiment described above, the algorithm is used when all of the next tests to be performed in the three modules M1, M2, M3 use the same test device. However, the algorithm can also be used when some of the next tests to be performed in the modules M1, M2, M3 use the same test device. Further, the algorithm may be used when the next test may, in some way, interfere with another test if the tests are performed concurrently. In addition, in this preferred embodiment described above, both of the current utilization rate and the target utilization rate are used to select the next test. However, either the current utilization rate or the target utilization rate can be independently used.

The method according to this preferred embodiment and the algorithm used therein tests three modules M1, M2, M3. However, the method may be used to test any desired number of modules. The following algorithm can be used to test any number, n, of modules.

$$Dn = \text{the current utilization rate} - \text{the target utilization rate}$$

the current utilization rate=(Un+Alpha*Tx/Tmax)/(1+Alpha)
Un=(the past time that was required to test with a specific test device in a module)/(the overall past time)
Tx=the predicted time required for the next test
Tmax=the maximum value of the predicted times required for the next tests using the same test device The target utilization rate=(the past time that was required to test with a specific testing device in a module+the predicted time required for the next test using the same specific testing device)/(the time that is required to complete all of the tests of all of the modules)

The algorithm described above selects the test which has the smallest value of Dn as the next test to be performed.

The current utilization rate and the target utilization rate are used to select the test which has higher priority. By selecting the test having the higher priority, the idle time in the module is minimized, and thus, the overall time required to complete all of the tests is minimized.

With preferred embodiments of the present invention, the parameters and characteristics of a communication device which includes many different types of modules can be efficiently and effectively performed automatically. In addition, since some tests can be performed simultaneously, it is possible to significantly reduce the time required to complete all of the tests of all of the modules. Further, since the tests which have higher priority can be selected by using a certain value (the current utilization rate and the target utilization rate), it is possible to effectively reduce the overall testing time.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for testing characteristics of a communication device that includes a plurality of modules using a test fixture comprising the steps of:
   connecting the communication device to the test fixture;
   determining if tests to be performed on the plurality of modules can be simultaneously performed;
   performing the tests to be performed on the plurality of modules for any tests that are determined can be simultaneously performed;
   calculating a numerical value for each of the plurality of modules if it is determined that the tests to be performed cannot be simultaneously performed;
   selecting one of the tests based on the calculated numerical value; and
   performing the selected one of the tests based on the calculated numerical value and suspending the test or tests on the remaining modules of the plurality of modules other than the selected one of the tests.

2. The method according to claim 1, wherein the numerical value is a ratio of time required to test with a specific testing device to an overall amount of time that has passed.

3. The method according to claim 1, wherein the numerical value is a ratio of a time to complete the tests using a specific testing device of a module of the plurality of modules to a time to complete all of the tests of all of the plurality of modules.

4. The method according to claim 1, wherein the plurality of modules are selected from the group consisting of a WiFi module, a WLAN module, a WiMax module, a UWB module, a MDTV module, a GPS module, a Blue Tooth module, and a WCDMA module.

5. The method according to claim 1, wherein the test fixture includes a microprocessor.

6. The method according to claim 4, wherein the test fixture includes a plurality of different types of interfaces arranged to connect the plurality of modules to the test fixture.

7. A test fixture for testing characteristics of a communication device that includes a plurality of modules comprising:
   a plurality of interfaces arranged to be connected to the plurality of modules of the communication device; and
   a controller arranged to determine if tests to be performed on the plurality of modules can be simultaneously performed, to perform the tests to be performed on the plurality of modules for any tests that are determined can be simultaneously performed, to calculate a numerical value for each of the plurality of modules if it is determined that the tests to be performed cannot be simultaneously performed, to select one of the tests based on the calculated numerical value, and to perform the selected one of the tests based on the calculated numerical value and suspending the test or tests on the remaining modules of the plurality of modules other than the selected one of the tests.

8. The test fixture according to claim 7, wherein the plurality of interfaces are selected from the group consisting of a universal serial bus interface, a secure disk input output interface, a serial peripheral interface, an universal asynchronous receiver/transmitter interface, and a hardware platform interface.

9. The test module according to claim 7, wherein the numerical value calculated by the controller is a ratio of time required to test with a specific testing device to an overall amount of time that has passed.

10. The test module according to claim 7, wherein the numerical value calculated by the controller is a ratio of a time to complete the tests using a specific testing device of a module of the plurality of modules to a time to complete all of the tests of all of the plurality of modules.

11. The test fixture according to claim 7, wherein the controller is a microprocessor.

* * * * *